United States Patent Office 3,504,005
Patented Mar. 31, 1970

3,504,005
ORGANOANTIMONY AND -BISMUTH COMPOUNDS
Kurt Moedritzer, Webster Groves, John R. Van Wazer, Ladue, and Harold I. Weingarten, St. Louis, Mo., assignors to Monsanto Company, St. Louis, Mo., a corporation of Delaware
No Drawing. Filed Jan. 3, 1966, Ser. No. 518,014
Int. Cl. C07f 9/90
U.S. Cl. 260—446                9 Claims

ABSTRACT OF THE DISCLOSURE

The present invention relates to organometallic antimony or bismuth compounds, $R_{3-n}MX_{n-m}Y_m$ in which $R_3$ is selected from the group of hydrocarbyl radicals having from 1 to 20 carbon atoms; M is antimony or bismuth; and X and Y are different members of the group of halogen, alkoxyl, thioalkyl, dialkylamino, cyano, cyanate, thiocyanate, azide, and acetylide radicals; $n$ is 2 or 3, $m$ is 1 or 2, with the requirement that $m$ be less than $n$.

The compounds of the invention have utility as functional fluids, dielectric materials, insecticides and as additives to polymers.

---

The present invention relates to novel organometallic compounds which contain antimony or bismuth, and also to processes for the preparation of such compounds.

According to the invention, there are provided new and valuable antimony or bismuth containing compounds having the general formula:

$$R_{3-n}MX_{n-m}Y_m$$

in which R is selected from the group consisting of hydrocarbyl radicals having from 1 to 20 carbon atoms, such as saturated and unsaturated alkyl and cycloalkyl radicals having from 1 to 20 carbon atoms, and phenyl and substituted phenyl radicals having from 6 to 20 carbon atoms; M is a metal selected from the group consisting of antimony and bismuth; and X and Y, are different members selected from the group consisting of a halogen such as fluorine, chlorine, bromine and iodine as well as alkoxyl, thioalkyl, dialkylamino, cyano, cyanate, thiocyanate, azide and acetylide radicals; $n$ is 2 or 3, and $m$ is 1 or 2, with the requirement that $m$ be less than $n$. For example, when $n$ is 3, $m$ is 2, and X is fluorine and Y is dimethylamino the product is $$MF[N(CH_3)_2]_2$$

having a molecular weight of 209 when M is antimony and a molecular weight of 316 when M is bismuth.

The compounds of the present invention may be grouped into two categories, based upon the general formula $R_{3-n}MX_{n-m}Y_m$ set forth above.

(A) $n=3$:    $MX_{3-m}Y_m$    $m=1$ or $2$
(B) $n=2$:    $R_1MXY$

Specific examples within these categories are shown below:

(A) $SbFCl_2$, $SbBr_2Cl$, $SbI(OR)_2$, $SbCl_2(OR)$, $Sb(SR)_2I$, $Sb(CN)_2F$, $Sb(CNO)_2Br$, $Sb(CNS)(OR)_2$, $Sb(C\equiv CR)Cl_2$, $Sb(N_3)_2Br$, $BiFCl_2$, $BiBrCl_2$, $BiBrI_2$ $Bi(OR)(NR_2)_2$, $Bi(CN)F_2$, $Bi(CNO)_2Cl$, $Bi(CNS)Br_2$, $Bi(C\equiv CR_2Br$, $BiCl_2(N_3)$.

(B) $RSbClBr$, $RSbBrI$, $RSbFBr$, $RSb(OR)Cl$, $RSb(NR_2)(SR)$, $RSb(CN)F$, $RSb(CNO)Cl$, $RSb(C\equiv CR)Cl$, $RSbF(N_3)$, $RBiClBr$, $RBiClI$, $RBiCl(OR)$, $RBi(NR_2)(OR)$, $RBi(CN)Cl$, $RBi(CNO)Br$, $RBi(N_3)Cl$, $RBi(C\equiv CR)Cl$, where R is selected from the group consisting of hydrocarbyl radicals having from 1–20 carbon atoms.

The general method of preparation of the novel antimony or bismuth compounds, $R_{3-n}MX_{n-m}Y_m$ utilizes pairs of compounds of the general formula $R_{3-n}MX_n$ and $R_{3-n}MY_n$ (with the meanings of R, M, X, Y, $m$ and $n$ as described above) which are reacted in the respective mol proportions of 1:0.5 to 1:50, or preferably 1:0.2 to 1:5. A specific range of proportions to yield any desired compound is approximately stoichiometric, as shown below, although the broader ranges are helpful in carrying the reaction to completion with respect to any specific starting material.

| Category | Major Product | Prepared From |
|---|---|---|
| $n=3$ | $MX_2Y$ | $2MX_3+MY_3$ |
|  | $MXY_2$ | $MX_3+2MY_3$ |
| $n=2$ | $RMXY$ | $RMX_2+RMY_2$ |

The mixture of the two components undergoes reaction at a temperature of from $-20°$ C. to $300°$ C., a preferred range being from $25°$ C. to $150°$ C. The compounds that result exist as variously mixed substituted species of the general formula $R_{3-n}MX_{n-m}Y_m$ appearing in various proportions depending on the mol proportions of the reactants. As an example antimony trichloride is reacted with trimethylmercapto antimony in the mol proportion 1:2 to obtain the products, dichloromethylmercaptoantimony and dimethylmercapto chloroantimony in the mol proportion of 1:2. As another specific example fluorobis(dimethylamino) antimony is obtained by heating and mixing together trifluoroantimony with tris(dimethylamino)antimony at a temperature of about $100°$ C. in a pressure vessel.

Separation of the mixed products from the reaction mixture is carried out by conventional means such as chromatography, countercurrent extraction in a solvent, or distillation. However, the mixtures of variously substituted compounds which are obtained may often be used in the form of mixtures for certain industrial applications.

The preparative reaction is preferably conducted in a closed vessel, although the use of relatively high boiling starting materials, e.g., a boiling point of at least $100°$ C. for the antimony or bismuth materials, permits the use of an open vessel.

While the antimony and bismuth components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction vessel, autoclave, or reaction tubes using an inert atmosphere such as nitrogen or helium gas. The reaction vessels are then maintained at a temperature in the range of from $-20°$ C. to $300°$ C., for example at $100°$ C. for a period of time of from 1 hour to 200 hours, with the higher temperatures providing a shorter reaction time. If desired a solvent such as an aromatic hydrocarbon such as benzene, an aliphatic hydrocarbon such as hexane, or an oxygen or halogen containing solvent such as ether or carbon tetrachloride may be employed, although a solvent is not essential. The products of the present invention have good stability.

The following examples illustrate specific embodiments of the present invention.

EXAMPLE 1

The preparation of the mixed methylmercapto and chlorine group containing antimony compounds is shown in the present example. A pressure tube is charged with 0.01 mol of trichloroantimony together with 0.01 of a mol of tris(methylmercapto)antimony. The tube containing this mixture is sealed under nitrogen, and is then heated in a tube furnace at about 120° C. Other tubes are similarly charged with the ratios of the reactants as shown in the table below. The progress of the reaction is followed by withdrawing the tube from the furnace from time to time and measuring the presence of the desired mixed compound reaction products having the formulae $$SbCl_2(SCH_3) \text{ and } SbCl(SCH_3)_2$$

by proton nuclear magnetic resonance. The table below shows the relationship of the two components in the products.

DISTRIBUTION (MOL PERCENT) OF MIXED CHLORINE METHYLMERCAPTO ANTIMONY COMPOUNDS

| Mol ratio (reactants) $SbCl_3$ to $Sb(SCH_3)_3$ | Mol percent $SbCl_2(SCH_3)$ | Mol percent $SbCl(SCH_3)_2$ |
|---|---|---|
| 1:3 | 12.2 | 87.8 |
| 1:1.5 | 31.9 | 68.1 |
| 1:0.88 | 57.6 | 42.4 |
| 1:0.44 | 85.8 | 14.2 |
| 1:0.2 | 96.4 | 3.6 |

In order to separate the desired compounds from the reaction mixture, separation procedures such as chromatographic adsorption and distillation are employed. Distillation is preferably carried out under vacuum conditions. For example the compound $SbCl_2(SCH_3)$ has a boiling point of approximately 57° C. at 25 mm. pressure, while the compound $SbCl(SCH_3)_2$ shown above has a boiling point of 88° C. at 25 mm. pressure. Separation of the two compounds is readily carried out by distillation.

Identification of the molecular characterization of the compositions of the present example is conducted by proton nuclear magnetic resonance spectroscopy.

EXAMPLE 2

When the procedure of Example 1 is used with 10 millimoles of trichloroantimony and 5 millimoles of tribromoantimony as the reactants in 50 milliliters of benzene as the solvent, with reaction being conducted at 75° C., the major product is dichlorobromoantimony.

EXAMPLE 3

When the procedure of Example 1 is used with 5 millimoles of trichloroantimony and 10 millimoles of tribromoantimony as the reactants in 50 milliliters of benzene as the solvent, with reaction being conducted at 75° C., the major product is dibromochloroantimony.

EXAMPLE 4

When the procedure of Example 1 is used with 10 millimoles of trichloroantimony and 5 millimoles of triiodoantimony as the reactants in 50 milliliters of benzene as the solvent, with reaction being conducted at 75° C., the major product is dichloroiodoantimony.

EXAMPLE 5

When the procedure of Example 1 is used with 5 millimoles of trichloroantimony and 10 millimoles of triiodoantimony as the reactants in 50 milliliters of benzene as the solvent, with reaction being conducted at 75° C., the major product is diiodochloroantimony.

EXAMPLE 6

When the procedure of Example 1 is used with 10 millimoles of tribromoantimony and 5 millimoles of triiodoantimony as the reactants in 50 milliliters of benzene as the solvent, with reaction being conducted at 75° C., the major product is dibromoiodoantimony.

EXAMPLE 7

When the procedure of Example 1 is used with 5 millimoles of tribromoantimony and 10 millimoles of triiodoantimony as the reactants in 50 milliliters of benzene as the solvent, with reaction being conducted at 75° C., the major product is diiodobromoantimony.

EXAMPLE 8

When the procedure of Example 1 is used with 3 millimoles of trimethylmercaptoantimony and 6 millimoles of tricyanoantimony as the reactants in 50 milliliters of xylene as the solvent, with reaction being conducted at 50° C., the major product is dicyanomethylmercaptoantimony.

EXAMPLE 9

When the procedure of Example 1 is used with 6 millimoles of trimethylmercaptoantimony and 3 millimoles of tricyanoantimony as the reactants in 50 milliliters of xylene as the solvent, with reaction being conducted at 50° C., the major product is cyanodimethylmercaptoantimony.

EXAMPLE 10

When the procedure of Example 1 is used with 2 millimoles of tribromobismuth and 4 millimoles of trimethylmercaptobismuth as the reactants in 50 milliliters of toluene as the solvent, with reaction being conducted at 150° C., the major product is dimethylmercaptobromobismuth.

EXAMPLE 11

When the procedure of Example 1 is used with 4 millimoles of tribromobismuth and 2 millimoles of trimethylmercaptobismuth as the reactants in 50 milliliters of toluene as the solvent, with reaction being conducted at 150° C., the major product is methylmercaptodibromobismuth.

EXAMPLE 12

When the procedure of Example 1 is used with 3 millimoles of trisdimethylaminobismuth and 6 millimoles of bismuthtribromide as the reactants in 50 milliliters of toluene as the solvent, with reaction being conducted at 25° C., the major product is dibromodimethylaminobismuth.

EXAMPLE 13

When the procedure of Example 1 is used with 6 millimoles of trisdimethylaminobismuth and 3 millimoles of bismuthtribromide as the reactants in 50 milliliters of toluene as the solvent, with reaction being conducted at 25° C., the major product is bromobisdimethylaminobismuth.

EXAMPLE 14

When the procedure of Example 1 is used with 2 millimoles of tricyanatoantimony and 4 millimoles of tribromoantimony as the reactants in 50 milliliters of toluene as the solvent, with reaction being conducted at 75° C., the major product is dibromocyanatoantimony.

EXAMPLE 15

When the procedure of Example 1 is used with 4 millimoles of tricyanatoantimony and 2 millimoles of tribromoantimony as the reactants in 50 milliliters of xylene as the solvent, with reaction being conducted at 75° C., the major product is dicyanatobromoantimony.

EXAMPLE 16

When the procedure of Example 1 is used with 5 millimoles of bismuthtrichloride and 10 millimoles of trimethoxybismuth as the reactants in 30 milliliaters of xylene as the solvent, with reaction being conducted at 50° C., the major product is bistrimethoxychlorobismuth.

EXAMPLE 17

When the procedure of Example 1 is used with 10 millimoles of bismuthtrichloride and 5 millimoles of trimethoxybismuth as the reactants in 30 milliliters of xylene as the solvent, with reaction being conducted at 50° C., the major product is dichloromethoxybismuth.

EXAMPLE 18

When the procedure of Example 1 is used with 3 millimoles of trisdimethylaminoantimony and 6 millimoles of trimethylmercaptoantimony as the reactants in 25 milliliters of xylene as the solvent, with reaction being conducted at 150° C., the major product is bismethylmercaptodimethylaminoantimony.

EXAMPLE 19

When the procedure of Example 1 is used with 6 millimoles of trisdimethylaminoantimony and 3 millimoles of trimethylmercaptoantimony as the reactants in 25 milliliters of xylene as the solvent, with reaction being conducted at 150° C., the major product is bisdimethylaminomethylmercaptoantimony.

EXAMPLE 20

When the procedure of Example 1 is used with 2 millimoles of trichlorobismuth and 4 millimoles of tricyanobismuth as the reactants in 25 milliliters of xylene as the solvent, with reaction being conducted at 50° C., the major product is dicyanochlorobismuth.

EXAMPLE 21

When the procedure of Example 1 is used with 4 millimoles of trichlorobismuth and 2 millimoles of tricyanobismuth as the reactants in 25 milliliters of xylene as the solvent, with reaction being conducted at 50° C., the major product is dichlorocyanobismuth.

EXAMPLE 22

When the procedure of Example 1 is used with 1.5 millimoles of trifluoroantimony and 3 millimoles of tristhiocyanoantimony as the reactions in 25 milliliters of xylene as the solvent, with reaction being conducted at 75° C., the major product is dithiocyanofluoroantimony.

EXAMPLE 23

When the procedure of Example 1 is used with 3 millimoles of trifluoroantimony and 1.5 millimoles of trithiocyanoantimony as the reactants in 25 milliliters of xylene as the solvent, with reaction being conducted at 75° C., the major product is difluorothiocyanoantimony.

EXAMPLE 24

When the procedure of Example 1 is used with 4 millimoles of trismethylmercaptobismuth and 2 millimoles of bismuthtrichloride as the reactants in 50 milliliters of benzene as the solvent, with reaction being conducted at 50° C., the major product is bismethylmercaptobismuthchloride.

EXAMPLE 25

When the procedure of Example 1 is used with 2 millimoles of trismethylmercaptobismuth and 4 millimoles of bismuthtrichloride as the reactants in 50 milliliters of benzene as the solvent, with reaction being conducted at 50° C., the major product is dichloromethylmercaptobismuth.

EXAMPLE 26

When the procedure of Example 1 is used with 3 millimoles of tribromobismuth and 6 millimoles of triethoxybismuth as the reactants in 50 milliliters of benzene as the solvent, with reaction being conducted at 100° C., the major product is diethoxybismuthbromide.

EXAMPLE 27

When the procedure of Example 1 is used with 6 millimoles of tribromobismuth and 2 millimoles of triethoxybismuth as the reactants in 50 milliliters of benzene as the solvent, with reaction being conducted at 100° C., the major product is dibromoethoxybismuth.

EXAMPLE 28

When the procedure of Example 1 is used with 2 millimoles of triiodobismuth and 4 millimoles of triacetylidobismuth as the reactants in 50 milliliters of hexane as the solvent, with reaction being conducted at 50° C., the major product is diacetylidoiodobismuth.

EXAMPLE 29

When the procedure of Example 1 is used with 4 millimoles of triiodobismuth and 2 millimoles of triacetylidobismuth as the reactants in 50 milliliters of hexane as the solvent, with reaction being conducted at 50° C., the major product is acetylidodiiodobismuth.

EXAMPLE 30

When the procedure of Example 1 is used with 5 millimoles of trifluoroantimony in 10 millimoles of antimony triazide as the reactants in 50 milliliters of carbon tetrachloride as the solvent, with reaction being conducted at 25° C., the major product is fluoroantimonydiazide.

EXAMPLE 31

When the procedure of Example 1 is used with 10 millimoles of trifluoroantimony and 5 millimoles of antimonytriazide as the reactants in 50 milliliters of carbon tetrachloride as the solvent, with reaction being conducted at 25° C., the major product is difluoroantimonyazide.

EXAMPLE 32

When the procedure of Example 1 is used with 2 millimoles of trichlorobismuth and 4 millimoles of trisdiethylaminobismuth as the reactants in 50 milliliters of hexane as the solvent, with reaction being conducted at 25° C., the major product is bisdiethylaminobismuthchloride.

EXAMPLE 33

When the procedure of Example 1 is used with 4 millimoles of trichlorobismuth and 2 millimoles of trisdiethylaminobismuth as the reactants in 50 milliliters of hexane as the solvent, with reaction being conducted at 25° C., the major product is diethylaminobismuthdichloride.

EXAMPLE 34

When the procedure of Example 1 is used with 3 millimoles of trimethylmercaptobismuth and 6 millimoles of trimethoxybismuth as the reactants in 50 milliliters of benzene as the solvent, with reaction being conducted at 80° C., the major product is methylmercaptodimethoxybismuth.

EXAMPLE 35

When the procedure of Example 1 is used with 6 millimoles of trimethylmercaptobismuth and 3 millimoles of trimethoxybismuth as the reactants in 50 milliliters of benzene as the solvent, with reaction being conducted at 80° C., the major product is bismethylmercaptomethoxybismuth.

EXAMPLE 36

When the procedure of Example 1 is used with 2 millimoles of tribromonantimony and 4 millimoles of tristhiophenylantimony as the reactants in 100 milliliters of toluene as the solvent, with reaction being conducted at 120° C., the major product is bisthiophenylbromoantimony.

EXAMPLE 37

When the procedure of Example 1 is used with 4 millimoles of tribromoantimony and 2 millimoles of trithiophenylantimony as the reactants in 100 milliliters of toluene as the solvent with reaction being conducted at 120° C., the major product is dibromothiophenylantimony.

EXAMPLE 38

When the procedure of Example 1 is used with 3 millimoles of trichloroantimony and 6 millimoles of triphenoxyantimony as the reactants in 100 milliliters of toluene as the solvent, with reaction being conducted at 120° C., the major product is diphenoxychloroantimony.

EXAMPLE 39

When the procedure of Example 1 is used with 6 millimoles of trichloroantimony and 3 millimoles of triphenoxyantimony as the reactants in 100 milliliters of toluene as the solvent, with reaction being conducted at 120° C., the major product is dichlorophenoxyantimony.

EXAMPLE 40

When the procedure of Example 1 is used with 2 millimoles of bismuthtribromide and 4 millimoles of triphenoxybismuth as the reactants in 25 milliliters of toluene as the solvent, with reaction being conducted at 75° C., the major product is diphenoxybismuthchloride.

EXAMPLE 41

When the procedure of Example 1 is used with 4 millimoles of bismuthtribromide and 2 millimoles of triphenoxybismuth as the reactants in 25 milliters of toluene as the solvent, with reaction being conducted at 75° C., the major product is dibromophenoxybismuth.

EXAMPLE 42

When the procedure of Example 1 is used with 5 millimoles of trifluoroantimony and 10 millimoles of trismethylphenylaminoantimony as the reactants in 25 milliliters of toluene as the solvent, with reaction being conducted at 100° C., the major prdouct is bismethylphenylaminofluoroantimony.

EXAMPLE 43

When the procedure of Example 1 is used with 10 millimoles of trifluoroantimony and 5 millimoles of trismethylphenylaminoantimony as the reactants in 25 milliliters of toluene as the solvent, with reaction being conducted at 100° C., the major product is methylphenylaminodifluoroantimony.

EXAMPLE 44

When the procedure of Example 1 is used with 4 millimoles of tribromobismuth and 8 millimoles of triphenoxybismuth as the reactants in 50 milliliter of hexane as the solvent, with reaction being conducted at 65° C., the major product is bisphenoxybismuthbromide.

EXAMPLE 45

When the procedure of Example 1 is used with 8 millimoles of tribromobismuth and 4 millimoles of triphenoxybismuth as the reactants in 50 milliliters of hexane as the solvent, with reaction being conducted at 65° C., the major product is phenoxybismuthdibromide.

EXAMPLE 46

When the procedure of Example 1 is used with 3 millimoles of methyldichloroantimony and 3 millimoles of methyldibromoantimony as the reactants in 25 milliliters of benzene as the solvent, with reaction being conducted at 50° C., the major product is methylchlorobromoantimony.

EXAMPLE 47

When the procedure of Example 1 is used with 4 millimoles of methylidchloroantimony and 4 millimoles of methyldiiodoantimony as the reactants in 25 milliliters of benzene as the solvent, with reaction being conducted at 50° C., the major product is methylchloroiodoantimony.

EXAMPLE 48

When the procedure of Example 1 is used with 2 millimoles of methyldibromoantimony and 2 millimoles of methyldiiodoantimony as the reactants in 25 milliliters of benzene as the solvent, with reaction being conducted at 50° C., the major product is methylbromoiodoantimony.

EXAMPLE 49

When the procedure of Example 1 is used with 2 millimoles of methyldichloroantimony and 2 millimoles of methyldicyanoantimony as the reactants in 30 milliliters of benzene as the solvent, with reaction being conducted at 50° C., the major product is methylchlorocyanoantimony.

EXAMPLE 50

When the procedure of Example 1 is used with 3 millimoles of methyldibromoantimony and 3 millimoles of methyldicyanoantimony as the reactants in 30 milliliters of benzene as the solvent, with reaction being conducted at 50° C., the major product is methylbromocyanoantimony.

EXAMPLE 51

When the procedure of Example 1 is used with 4 millimoles of methyldichloroantimony and 4 millimoles of methyldimethoxyantimony as the reactants in 25 milliliters of hexane as the solvent, with reaction being conducted at 50° C., the major product is methylmethoxychloroantimony.

EXAMPLE 52

When the procedure of Example 1 is used with 3 millimoles of methyldibromoantimony and 3 millimoles of methyldimethoxyantimony as the reactants in 25 milliliters of chloroform as the solvent, with reaction being conducted at 50° C., the major product is methylmethoxybromoantimony.

EXAMPLE 53

When the procedure of Example 1 is used with 3 millimoles of methyldiiodoantimony and 3 millimoles of methyldimethoxyantimony as the reactants in 25 milliliters of chloroform as the solvent, with reaction being conducted at 50° C., the major product is methylmethoxyiodoantimony.

EXAMPLE 54

When the procedure of Example 1 is used with 2 millimoles of methyldichloroantimony and 2 millimoles of methylbismethylmercaptoantimony as the reactants in 50 milliliters of chloroform as the solvent, with reaction being conducted at 60° C., the major product is methylmethylmercaptochloroantimony.

EXAMPLE 55

When the procedure of Example 1 is used with 3 millimoles of methyldibromoantimony and 3 millimoles of methylbismethylmercaptoantimony as the reactants in 50 milliliters of chloroform as the solvent, with reaction being conducted at 60° C., the major product is methylmethylmercaptobromoantimony.

EXAMPLE 56

When the procedure of Example 1 is used with 2 millimoles of methyldiiodoantimony and 2 millimoles of methylbismethylmercaptoantimony as the reactants in 50 milliliters of chloroform as the solvent, with reaction being conducted at 60° C., the major product is methylmethylmercaptoiodoantimony.

EXAMPLE 57

When the procedure of Example 1 is used with 3 millimoles of methyldimethoxyantimony and 3 millimoles of methylbismethylmercaptoantimony as the reactants in 50 milliliters of xylene as the solvent, with reaction being conducted at 120° C., the major product is methylmethylmercaptomethoxyantimony.

EXAMPLE 58

When the procedure of Example 1 is used with 4 millimoles of ethyldichloroantimony and 4 millimoles of ethylbisdiethylaminoantimony as the reactants in 50 milliliters of xylene as the solvent, with reaction being conducted at 25° C., the major product is ethyldiethylaminochloroantimony.

EXAMPLE 59

When the procedure of Example 1 is used with 2 millimoles of phenyldicyanoantimony and 2 millimoles of phenyldicyanatoantimony as the reactants in 50 milliliters of xylene as the solvent, with reaction being conducted at 100° C., the major product is phenylcyanocyanatoantimony.

EXAMPLE 60

When the procedure of Example 1 is used with 3 millimoles of butyldichlorobismuth and 3 millimoles of butyldiphenoxybismuth as the reactants in 25 milliliters of xylene as the solvent, with reaction being conducted at 100° C., the major product is butylphenoxybismuthchloride.

EXAMPLE 61

When the procedure of Example 1 is used with 2 millimoles of phenyldibromobismuth and 2 millimoles of phenyldithiophenylbismuth as the reactants in 25 milliliters of xylene as the solvent, with reaction being conducted at 100° C., the major product is phenylthiophenylbismuthbromide.

EXAMPLE 62

When the procedure of Example 1 is used with 4 millimoles of benzylbismuthdichloride and 4 millimoles of benzylbismuthdicyanide as the reactants in 25 milliliters of xylene as the solvent, with reaction being conducted at 25° C., the major product is benzylcyanobismuthchloride.

The present mixed compounds have utility in a variety of industrial applications, for example, as functional fluids e.g. for the transmission of pressure in hydraulic systems. The present compounds also have utility as dielectric materials, for example in condensers or transformers.

The compounds are also generally characterized by biological activity such as in the form of insecticidal compositions.

The compounds of the invention are also useful as additives to polymers such as polyvinylchloride, for example, to provide plasticizing action, for example, by the use of butylantimony compounds having as the other moiety of the mixed compositions various other ligands such as chloro and other halogen groups, phenoxy, methoxy and other alkoxyl and aroxyl groups. The various mixed compounds of antimony or bismuth are also of utility as intermediates.

What is claimed is:

1. Mixed organometallic compounds having the general formula $$R_{3-n}SbX_{n-m}Y_m$$

in which R is selected from the group consisting of hydrocarbyl radicals having from 1 to 20 carbon atoms; X and Y are different components, which for X are selected from the group consisting of halogen, alkoxyl, thioalkyl, dialkylamino, cyano, cyanate, thiocyanate azide and acetylide; and for Y are selected from the group consisting of halogen cyano, cyanate, thiocyanate, azide, and acetylide; $n$ is 2 or 3, and $m$ is 1 or 2, with the requirement that $m$ be less than $n$, and that an organic group be present.

2. The compound $Sb[N(CH_3)_2]_2(SCH_3)$.
3. The compound $Sb[N(CH_3)_2] (SCH_3)_2$.
4. The compound $(CH_3) Sb(OCH_3) (SCH_3)$.
5. The compound $(C_2H_5) SbcCl[N(C_2H_5)_2]$.
6. The compound $(C_6H_5) BiBr (SC_6H_5)$.

7. Process for the preparation of mixed organometallic compounds having the general formula $$R_{3-n}MX_{n-m}Y_m$$

in which R is selected from the group consisting of hydrocarbyl radicals having from 1 to 20 carbon atoms; M is a metal selected from the group consisting of antimony and bismuth; X and Y are different components selected from the group consisting of halogen, alkoxyl, thioalkyl, dialkylamino, cyano, cyanate, thiocyanate azide and acetylide; $n$ is 2 or 3, and $m$ is 1 or 2, with the requirement that $m$ be less than $n$, and that an organic group be present, which comprises mixing and reacting $R_{3-n}MX_n$ and $R_{3-n}MY_n$ in the mol proportion of 1:0.05 to 1:50 at a temperature of −20° C. to 300° C.

8. Process for the preparation of mixed organometallic compounds having the general formula $$R_{3-n}SbX_{n-m}Y_m$$

in which R is selected from the group consisting of hydrocarbyl radicals having from 1 to 20 carbon atoms; X and Y are different components selected from the group consisting of halogen, alkoxyl, thioalkyl, dialkylamino, cyano, cyanate, thiocyanate azide and acetylide; $n$ is 2 or 3 and $m$ is 1 or 2 with the requirement that $m$ be less than $n$, and that an organic group be present, which comprises mixing and reacting $R_{3-n}SbX_n$ and $R_{3-n}SbY_n$ in the mol proportions of 1:0.05 to 1:50 at a temperature of −20° C. to 300° C.

9. Process for the preparation of mixed organometallic compounds having the general formula $$R_{3-n}BiX_{n-m}Y_m$$

in which R is selected from the group consisting of hydrocarbyl radicals having from 1 to 20 carbon atoms; X and Y are different components selected from the group consisting of halogen, alkoxyl, thioalkyl, dialkylamino, cyano, syanate, thiocyanate azide and acetylide; $n$ is 2 or 3 and $m$ is 1 or 2, with the requirement that $m$ be less than $n$, and that an organic group be present, which comprises mixing and reacting $R_{3-n}BiX_n$ and $R_{3-n}BiY_n$ in the mol proportions of 1:0.05 to 1:50 at a temperature of −20° C. to 300° C.

References Cited

UNITED STATES PATENTS

| | | | |
|---|---|---|---|
| 3,359,218 | 12/1967 | Wiles | 260—446 X |
| 3,239,411 | 3/1966 | Leebrick | 260—447 |
| 3,247,050 | 4/1966 | Leebrick | 260—447 |
| 3,341,477 | 9/1967 | Washburn et al. | 260—446 X |
| 3,341,478 | 9/1967 | Washburn et al. | 260—446 X |

OTHER REFERENCES

Jaquith Chem. Abstracts, vol. 57 (1963) p. 13799(d).
Addinall, Chem. Abstracts, vol. 55 (1961) p. 3265(f).
Laughlin, Chem. Abstracts (1961), vol. 55, p. 3265(f).
Chemical Abstracts Index (1962), vol. 56, p. 360(s).
Chemical Abstracts Index (1962), vol. 56, p. 204(s).

TOBIAS E. LEVOW, Primary Examiner

W. F. W. BELLAMY, Assistant Examiner

U.S. Cl. X.R.

260—45.75, 447, 999

PO-1050
(5/69)

UNITED STATES PATENT OFFICE
CERTIFICATE OF CORRECTION

Patent No. 3,504,005          Dated March 31, 1970

Inventor(s)     Kurt Moedritzer et al

It is certified that error appears in the above-identified patent and that said Letters Patent are hereby corrected as shown below:

Column 1, line 55, "categories," should be "catagories,".

Column 1, line 67, "Bi(C$\equiv$CR$_2$Br," should be "Bi(C$\equiv$CR)$_2$Br,".

Column 2, line 8, "1:0.5" should be "1:0.05".

Column 3, line 16, should be a "-" after "CHLORINE".

Column 3, line 18, "Mol ratie" should be "Mol ratio".

Column 5, line 34, "reactions" should be "reactants".

Column 7, line 18, "oxybismuth" should be "noxybismuth".

Column 7, line 61, "methylidchloroantimony" should be "methyldichloroantimony".

Signed and sealed this 14th day of September 1971.

(SEAL)
Attest:

EDWARD M. FLETCHER, JR.
Attesting Officer

ROBERT GOTTSCHALK
Acting Commissioner of Patents